US011916258B2

(12) United States Patent
Kang et al.

(10) Patent No.: US 11,916,258 B2
(45) Date of Patent: Feb. 27, 2024

(54) SECONDARY BATTERY

(71) Applicant: LG Chem, Ltd., Seoul (KR)

(72) Inventors: Gyung Soo Kang, Daejeon (KR); Jee Ho Kim, Daejeon (KR); Yong Tae Lee, Daejeon (KR); Myung Hoon Ko, Daejeon (KR); Jung Il Park, Daejeon (KR); Ki Youn Kim, Daejeon (KR)

(73) Assignee: LG Energy Solution, Ltd. (KR)

( * ) Notice: Subject to any disclaimer, the term of this patent is extended or adjusted under 35 U.S.C. 154(b) by 307 days.

(21) Appl. No.: 17/282,571

(22) PCT Filed: Oct. 4, 2019

(86) PCT No.: PCT/KR2019/013017
§ 371 (c)(1),
(2) Date: Apr. 2, 2021

(87) PCT Pub. No.: WO2020/071843
PCT Pub. Date: Apr. 9, 2020

(65) Prior Publication Data
US 2021/0344087 A1 Nov. 4, 2021

(30) Foreign Application Priority Data

Oct. 5, 2018 (KR) .................. 10-2018-0118867
Oct. 2, 2019 (KR) .................. 10-2019-0122402

(51) Int. Cl.
*H01M 50/581* (2021.01)
*H01M 10/653* (2014.01)
(Continued)

(52) U.S. Cl.
CPC ..... *H01M 50/581* (2021.01); *H01M 10/0422* (2013.01); *H01M 10/0431* (2013.01);
(Continued)

(58) Field of Classification Search
CPC .......... H01M 10/653; H01M 10/0431; H01M 50/581; H01M 50/116
See application file for complete search history.

(56) References Cited

U.S. PATENT DOCUMENTS

2005/0196665 A1  9/2005  Shimizu et al.
2007/0190407 A1* 8/2007  Fujikawa .............. H01M 50/46
429/174
(Continued)

FOREIGN PATENT DOCUMENTS

CN          1661828 A    8/2005
CN        102347463 A    2/2012
(Continued)

OTHER PUBLICATIONS

International Search Report for Application No. PCT/KR2019/013017, dated Jan. 14, 2020, 3 pages.
(Continued)

*Primary Examiner* — Karie O'Neill Apicella
(74) *Attorney, Agent, or Firm* — Lerner David LLP

(57) ABSTRACT

A secondary battery comprises an electrode assembly, a can, and an insulator. The electrode assembly includes a first electrode, a separator, and a second electrode alternately stacked and wound. The can has an accommodation part accommodating the electrode assembly therein, and the can comprises a first can and a second can having cylindrical shapes open in a direction facing each other. The insulator insulates an overlapping portion between the first can and the second can. The first can is electrically connected to the first electrode, and the second can is electrically connected to the second electrode. The insulator has a short-circuit induction through-part defined by a through-hole or a cutoff line, such that a short circuit occurs between the first can and the second can through the short-circuit induction through-
(Continued)

part when it is deformed in shape as heat or a pressure is applied to contract or expand the insulator.

18 Claims, 17 Drawing Sheets

(51) Int. Cl.
*H01M 50/107* (2021.01)
*H01M 50/116* (2021.01)
*H01M 50/578* (2021.01)
*H01M 10/04* (2006.01)

(52) U.S. Cl.
CPC ....... *H01M 10/653* (2015.04); *H01M 50/107* (2021.01); *H01M 50/116* (2021.01); *H01M 50/578* (2021.01); *H01M 2200/10* (2013.01); *H01M 2200/20* (2013.01)

(56) References Cited

U.S. PATENT DOCUMENTS

| | | |
|---|---|---|
| 2011/0052939 A1 | 3/2011 | Kim et al. |
| 2011/0052977 A1* | 3/2011 | Kurata ................. H01M 50/55 429/179 |
| 2012/0028094 A1 | 2/2012 | Kim et al. |
| 2013/0130066 A1 | 5/2013 | Pytlik et al. |
| 2015/0044525 A1 | 2/2015 | Jourdren et al. |
| 2016/0126584 A1* | 5/2016 | Lee ................. H01M 10/0587 429/94 |
| 2016/0141561 A1 | 5/2016 | Watanabe et al. |
| 2017/0033325 A1 | 2/2017 | Han et al. |
| 2017/0187025 A1 | 6/2017 | Watanabe et al. |

FOREIGN PATENT DOCUMENTS

| | | | |
|---|---|---|---|
| CN | 104124408 A | 10/2014 | |
| JP | S5844760 U | 3/1983 | |
| JP | S62113358 A | 5/1987 | |
| JP | H0582119 A | 4/1993 | |
| JP | 5524912 B2 | 6/2014 | |
| JP | 5529412 B2 | 6/2014 | |
| JP | 2016100122 A | 5/2016 | |
| JP | 2017120764 A | 7/2017 | |
| KR | 20040107999 * | 12/2004 | ........ H01M 10/0431 |
| KR | 100529097 B1 | 11/2005 | |
| KR | 20110076860 A | 7/2011 | |
| KR | 20140146128 A | 12/2014 | |
| KR | 20160010121 A | 1/2016 | |
| KR | 20160015898 A | 2/2016 | |
| KR | 20170013591 A | 2/2017 | |

OTHER PUBLICATIONS

Extended European Search Report including Written Opinion for Application No. 19869602.3 dated Oct. 15, 2021, pp. 1-8.
Search Report dated Aug. 3, 2022 from the Office Action for Chinese Application No. 201980063745.3 issued Aug. 11, 2022, pp. 1-3.

* cited by examiner

SECONDARY BATTERY

CROSS-REFERENCE TO RELATED APPLICATIONS

The present application is a national phase entry under 35 U.S.C. § 371 of International Application No. PCT/KR2019/013017 filed Oct. 4, 2019, which claims priority from Korean Patent Application Nos. 10-2018-0118867, filed on Oct. 5, 2018, and 10-2019-0122402, filed on Oct. 2, 2019, which are hereby incorporated by reference in their entirety.

TECHNICAL FIELD

The present invention relates to a secondary battery.

BACKGROUND ART

Secondary batteries are rechargeable, unlike primarily batteries, and also they are very capable of compact size and high capacity. Thus, recently, many studies on secondary batteries have been carried out. As technology development and demands for mobile devices increase, the demands for secondary batteries as energy sources are rapidly increasing.

Secondary batteries are classified into coin type cells, cylindrical type cells, prismatic type cells, and pouch type cells according to a shape of a battery case. In such a secondary battery, an electrode assembly mounted in a battery case is a chargeable and dischargeable power generating device having a structure in which an electrode and a separator are stacked.

The electrode assembly may be generally classified into a jelly-roll type electrode assembly, a stacked type electrode assembly, and a stack-folding type electrode assembly. In a jelly-roll type electrode assembly, a separator is interposed between a positive electrode and a negative electrode, each of which is provided as the form of a sheet coated with an active material, and then, the positive electrode, the separator, and the negative electrode are wound. In a stacked type electrode assembly, a plurality of positive and negative electrodes with a separator therebetween are sequentially stacked. In a stack/folding type electrode assembly, stacked type unit cells are wound together with a separation film having a long length. Among them, the jelly-roll type electrode assembly is widely used because the jelly-roll type electrode assembly has advantages in ease of manufacturing and high energy density per weight.

DISCLOSURE OF THE INVENTION

Technical Problem

One aspect of the present invention is to provide a secondary battery that can induce short circuit when high-temperature heat and high pressure occur, in order to improve stability of the battery.

Technical Solution

A secondary battery according to an embodiment of the present invention comprises an electrode assembly in which a first electrode, a separator, and a second electrode are alternately stacked to be wound, a can in which an accommodation part configured to accommodate the electrode assembly therein is formed and which comprises a first can and a second can, which have cylindrical shapes and are opened in a direction facing each other, and an insulator configured to insulate an overlapping portion between the first can and the second can, wherein the first can is electrically connected to the first electrode, and the second can is electrically connected to the second electrode, the insulator is provided with a short-circuit induction through-part having the form of a through-hole or a cutoff line, and short circuit occurs between the first can and the second can through the short-circuit induction through-part that is deformed in shape as heat or a pressure is applied to contract or expand the insulator.

Advantageous Effects

According to the present invention, the first electrode and the second electrode may be electrically connected to the first can and the second can, and the insulator in which the circuit-circuit induction through-part that insulates the first can and the second can from each other may be provided. As the high-temperature heat or the high pressure is applied to contract and expand the insulator, the insulator may be deformed in shape, and thus, the short circuit may occur between the first can and the second can through the short-circuit induction through-part. Therefore, the energy level of the battery may be reduced to prevent the battery from exploding.

MODE FOR CARRYING OUT THE INVENTION

Figure 1:
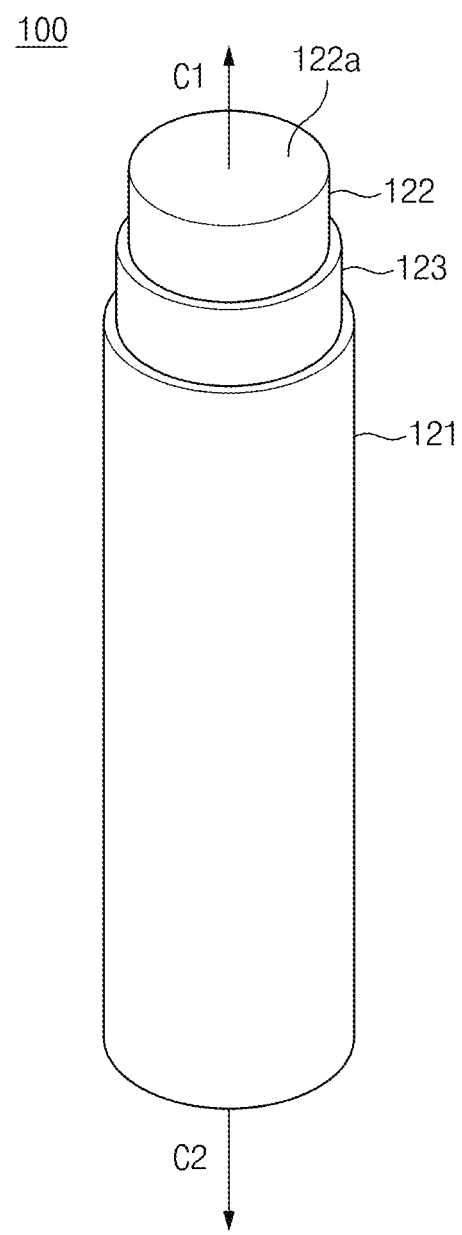
FIG. 1 is a perspective view of a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with consistent numerals as much as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

FIG. 1 is a perspective view of a secondary battery according to an embodiment of the present invention, and FIG. is a cross-sectional view of the secondary battery according to an embodiment of the present invention.

Figure 2:
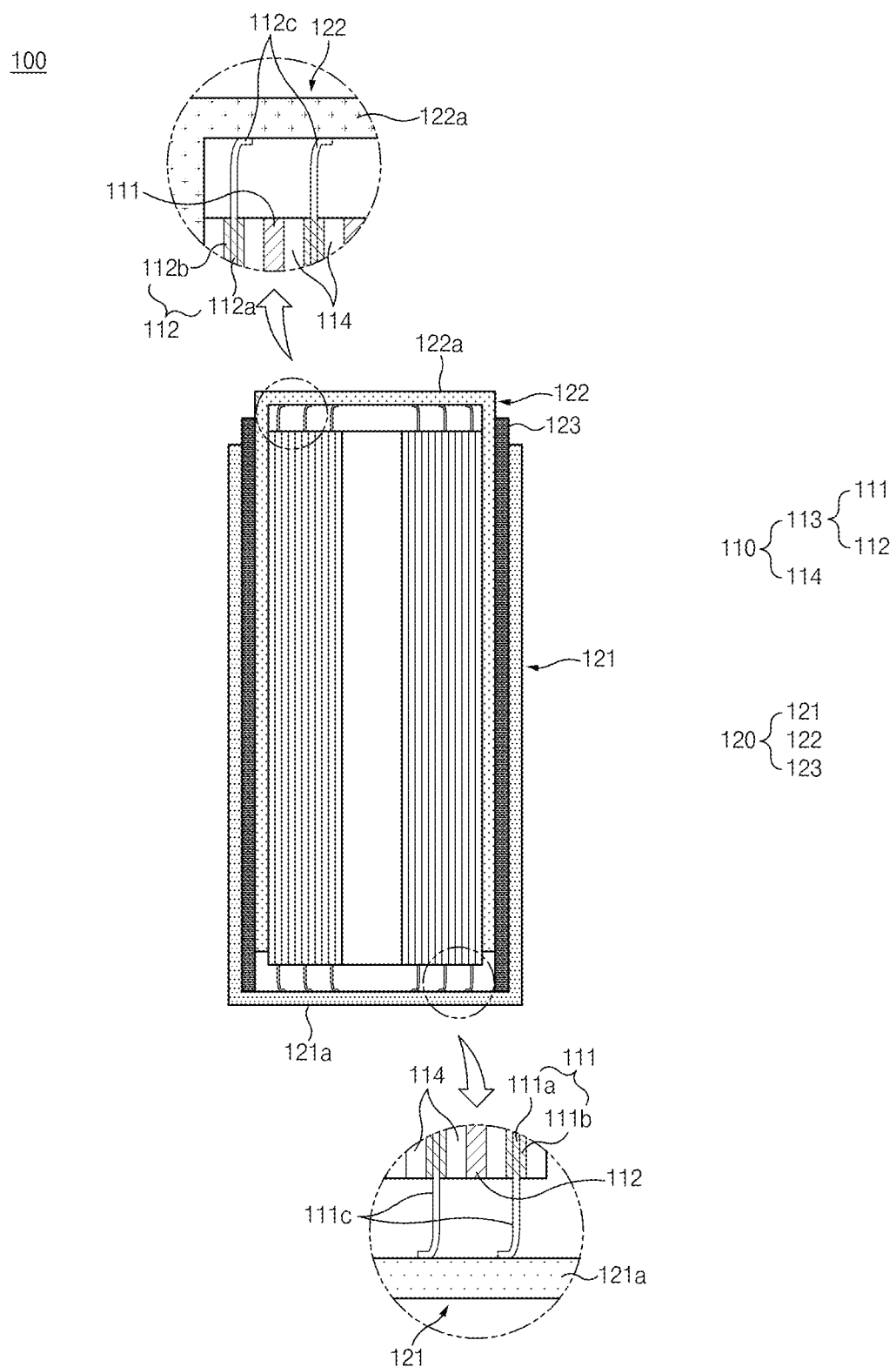
FIG. 2 is a cross-sectional view of the secondary battery according to an embodiment of the present invention.

Referring to FIGS. 1 and 2, a secondary battery 100 according to an embodiment of the present invention comprises an electrode assembly 110 in which a first electrode 111, a separator 114, and a second electrode 112 are alternately stacked, a can 120 comprising a first can 121 and a second can 122, which accommodate the electrode assembly 110 therein, and an insulator 123 insulating an overlapping portion between the first can 121 and the second can 122.

Figure 3:
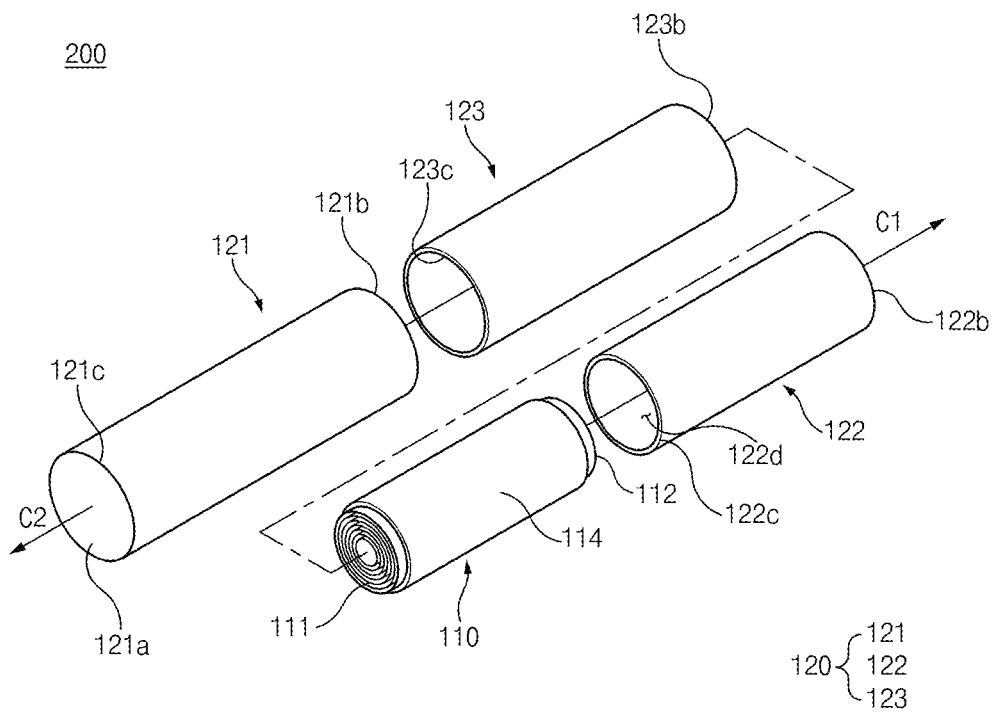
FIG. 3 is an exploded perspective view of the secondary battery according to an embodiment of the present invention.

FIG. 3 is an exploded perspective view of the secondary battery according to an embodiment of the present invention.

Hereinafter, the secondary battery according to an embodiment of the present invention will be described in more detail with reference to FIGS. 1 to 9.

Referring to FIGS. 2 and 3, the electrode assembly 110 may be a chargeable and dischargeable power generation element and have a structure in which an electrode 113 and the separator 114 are combined to be alternately stacked with each other. Here, the electrode assembly 110 may have a wound shape.

The electrode 113 may comprise the first electrode 111 and the second electrode 112. Also, the separator 114 may separate the first electrode 111 from the second electrode 112 to insulate the first and second electrodes 111 and 112 from each other. Here, each of the first electrode 111 and the second electrode may be provided in the form of a sheet and then be wound together with the separator 114 so as to be formed in a jelly roll type. Here, the electrode assembly 110 may be wound, for example, in a cylindrical shape.

The first electrode 111 may comprise a first electrode collector 111a and a first electrode active material 111b applied on the first electrode collector 111a. Also, the first electrode 111 may comprise a first electrode non-coating portion 111c that is not coated with the first electrode active material 111b.

Here, the first electrode 111 may be provided as, for example, a negative electrode and comprise a negative electrode collector (not shown) and a negative electrode active material (not shown) applied on the negative electrode collector. Also, a negative electrode non-coating portion that is not coated with the negative electrode active material may be formed on the first electrode 111.

For example, the negative electrode collector may be provided as foil made of a copper (Cu) or nickel (Ni) material. The negative electrode active material may comprise synthetic graphite, a lithium metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

The second electrode 112 may comprise a second electrode collector 112a and a second electrode active material 112b applied on the second electrode collector 112a. Also, the second electrode 112 may comprises a second electrode non-coating portion 112c that is not coated with the second electrode active material 112b.

Here, the second electrode 112 may be provided as, for example, a positive electrode and comprise a positive electrode collector (not shown) and a positive electrode active material (not shown) applied on the positive electrode collector. Also, a positive electrode non-coating portion that is not coated with the positive electrode active material may be formed on the second electrode 112.

For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The separator 114 may be made of an insulating material, and the first electrode 111, the separator 114, and the second electrode 112 may be alternately stacked. Here, the separator 114 may be disposed between the first electrode 111 and the second electrode 112 on outer surfaces of the first electrode 111 and the second electrode 112. Here, the separator 114 may be disposed at the outermost side in a width direction when the electrode assembly 110 is wound.

Also, the separator 114 may be made of a flexible material. Here, the separator 114 may be made of, for example, a polyolefin-based resin film such as polyethylene or polypropylene having micropores.

Figure 4:
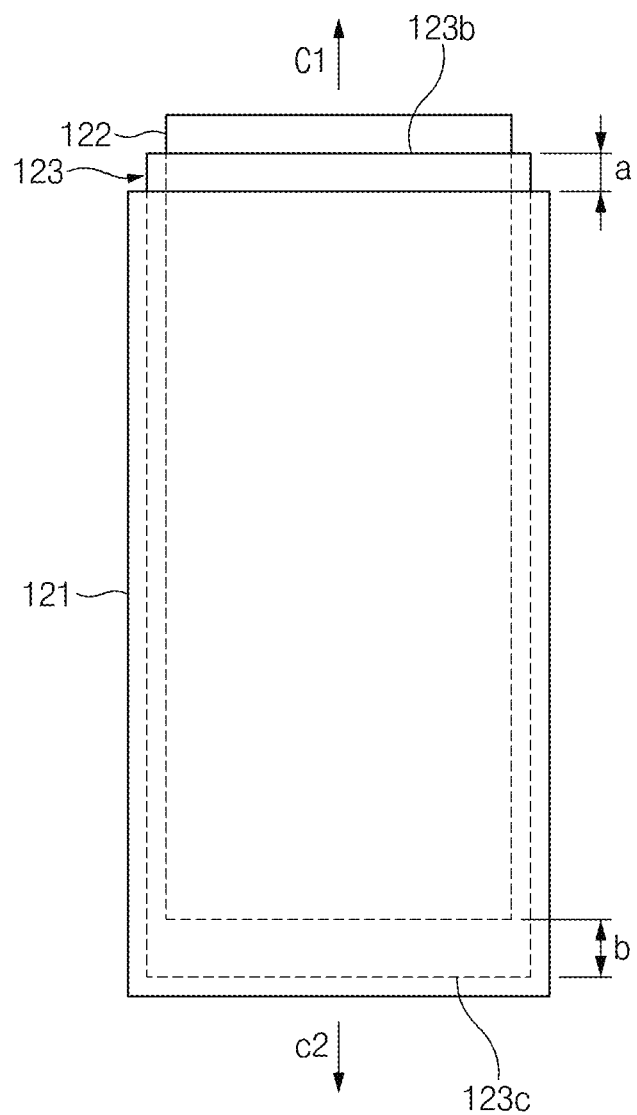
FIG. 4 is a front view of the secondary battery according to an embodiment of the present invention.
Figure 5:
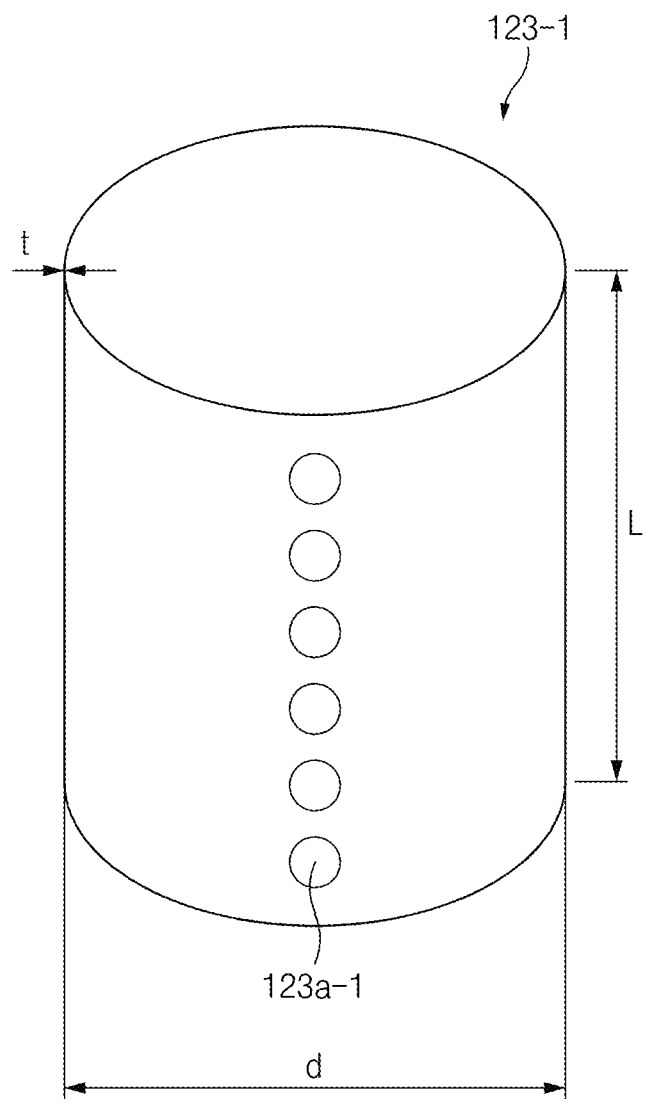
FIG. 5 is a perspective view illustrating a first example of an insulator in the secondary battery according to an embodiment of the present invention.

FIG. 4 is a front view of the secondary battery according to an embodiment of the present invention, and FIG. 5 is a perspective view illustrating a first example of the insulator in the secondary battery according to an embodiment of the present invention.

Referring to FIGS. 2 to 4, the can 120 may be provided with an accommodation part that accommodates the electrode assembly 110 therein, and the can 120 may comprise a first can 121 and a second can 122, which have cylindrical shapes and are opened in a direction facing each other.

Here, the first can 121 may be electrically connected to the first electrode 111, and the second can 122 may be electrically connected to the second electrode 112.

Also, each of the first can 121 and the second can 122 may have a cylindrical shape. The first can 121 may have an inner circumferential surface greater than an outer circumferential surface of the second can 122 so that the second can 122 is inserted into the first can 121.

Furthermore, the first can 121 may have one side 121b in which a first opening (not shown) that is opened in one direction C1 is formed and the other side 121c at which a first connection part 121a that is closed in the other direction C2 is formed. The second can 122 may have the other side 122c in which a second opening 122d that is opened in the other direction C2 is formed and one side 122b at which a second connection part 122a that is closed in the one direction C1 is formed. At this time, the first electrode 111 may have one end connected to the first connection part 121*a*, and the second electrode 112 may have one end connected to the second connection part 122*a*.

Here, one end 123*b* of the insulator 123 may extend to be closer to the second connection part 122*a* than one end of the first can 121. Also, the other end 123*c* of the insulator 123 may extend to be closer to the first connection part 121*a* than the other end of the second can 122. However, as described below, when the insulator is formed to be applied on an outer circumferential surface of the second can, the other end 123*c* of the insulator 123 may match the other end of the second can 122.

Here, a distance a between the one end of the first can 121 to the one end 123*b* of the insulator 123 may be greater than zero, and a distance b between the other end of the second can 122 to the other end 123*c* of the insulator 123 may be greater than zero.

The insulator 123 may comprise an insulation material to insulate the overlapping portion between the first can 121 and the second can 122.

Also, referring to FIGS. 2 to 5, a short-circuit induction through-part 123*a*-1 that is provided in the form of a through-hole or a cutoff line may be formed in the insulator 123. Here, short circuit may occur between the first can 121 and the second can 122 through the short-circuit induction through-part 123*a*-1 that is deformed in shape when the insulator 123 is contracted or expanded by high-temperature heat or a high pressure. Thus, an energy level of the secondary battery 100 may be lowered to prevent the secondary battery 100 from exploding. This is done because the insulator 123 is contracted or expanded when a predetermined temperature (or more) and a predetermined pressure (or more) are applied to the insulator 123. When the can increases in temperature or is expanded under abnormal situations, the insulation may also be subjected to the high-temperature heat and the high pressure, and thus, the insulator may be contracted or expanded to be deformed in shape.

The insulator 123 may comprise a polymer material. Also, the polymer material may comprise, for example, any one of polyethylene (PE), polypropylene (PP), and polyethylene terephthalate (PET). Particularly, the polymer material may comprise a polyethylene (PE) or polypropylene (PP) material having a melting point at a temperature of 180° C. or less. More specifically, the polymer material may comprise, for example, low-medium density PE having a melting point of 110° C. or medium-high density PE having a melting point of 120° C. to 180° C. Since the battery explodes at a temperature of about 180 degrees to 200 degrees, when the insulator made of the above-described material is used, the short circuit may occur between the first can 121 and the second can 122 so as to lower the energy level of the battery before the battery explodes.

Since resistance R corresponds to a value of the product of specific resistance and area per thickness, the resistance R of the cylindrical insulator 123 may satisfy following equation: R=material (p)*thickness (t)/A=material (p)*thickness (t)/(diameter (d)*height (L))

If the resistance is high, there is an advantage that an amount of heat is suddenly reduced. However, if the resistance is too high, an amount of heat to be generated may be too small, and thus, the resistance may be adjusted to have the amount of heat within a proper range. In this case, the resistance of the insulator 123 may be adjusted by changing the material p and the shapes d, L, and t.

For example, the insulator 123 may be applied on an outer circumferential surface of the second can 122 to form a coating layer. Here, the insulator 123 may be formed by applying an insulation material on the outer circumferential surface of the second can 122.

Furthermore, for another example, the insulator 123 may be attached to the outer circumferential surface of the second can 122 through any one of painting, printing, cladding, lamination, spraying, masking, dipping, and bonding. In more detail, the insulator 123 may be formed on the outer circumferential surface of the second can 122 through the painting of the insulation material on the outer circumferential surface of the second can 122, the spraying of the insulation material on the outer circumferential surface of the second can 122, the attaching of a masking agent on the outer circumferential surface of the second can 122 or attaching the insulation material to a portion except for a mask, putting the outer circumferential surface of the second can 122 into an insulation solution to form an insulation layer, allowing the insulator to adhere to the outer circumferential surface of the second can 122 by using an adhesive component, and laminating the insulator 123 on the outer circumferential surface of the second can 122.

For example, the first can 121 disposed at the outside may comprise steel, and the second can 122 disposed at the inside may comprise aluminum. Here, since the second can 122 comprises the aluminum, the second can 122 may be expanded by the high-temperature heat. As a result, the insulator 123 attached to the outer circumferential surface of the second can 122 may be expanded, and thus, the short circuit may easily occur between the first can 121 and the second can 122 due to the high-temperature heat through the short-circuit induction through-part 123*a*-1 formed in the insulator 123.

Here, the first electrode 111 may be provided as the negative electrode, and the second electrode 112 may be provided as the positive electrode.

Figure 6:
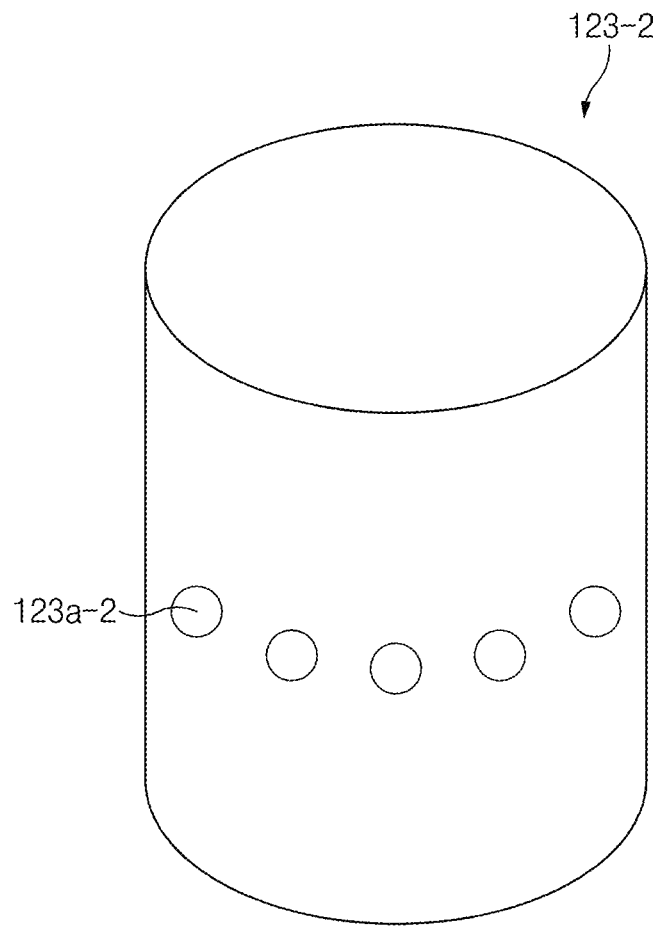
FIG. 6 is a perspective view illustrating a second example of the insulator in the secondary battery according to an embodiment of the present invention.
Figure 7:
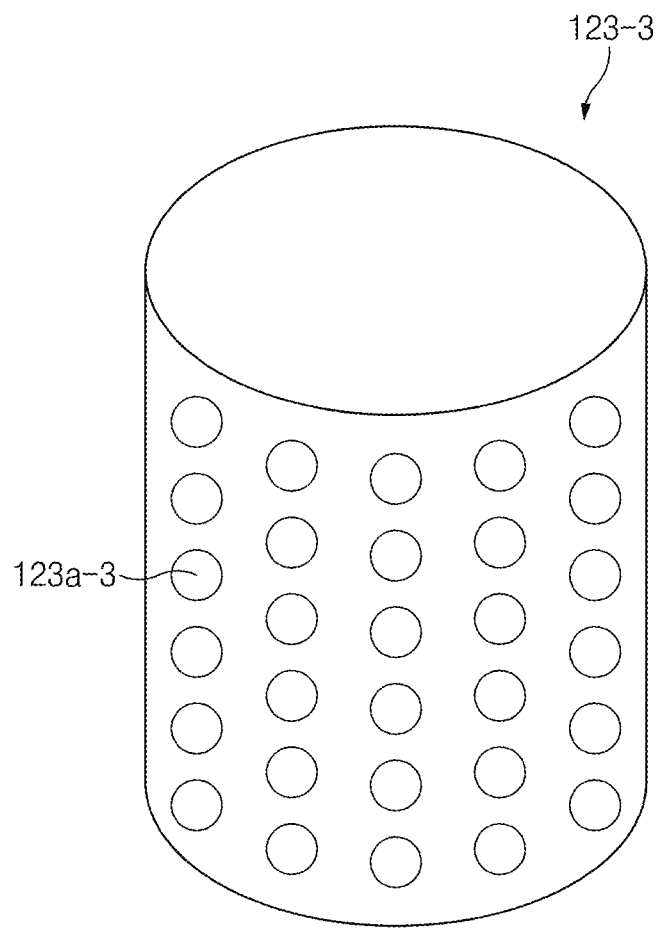
FIG. 7 is a perspective view illustrating a third example of the insulator in the secondary battery according to an embodiment of the present invention.
Figure 8:
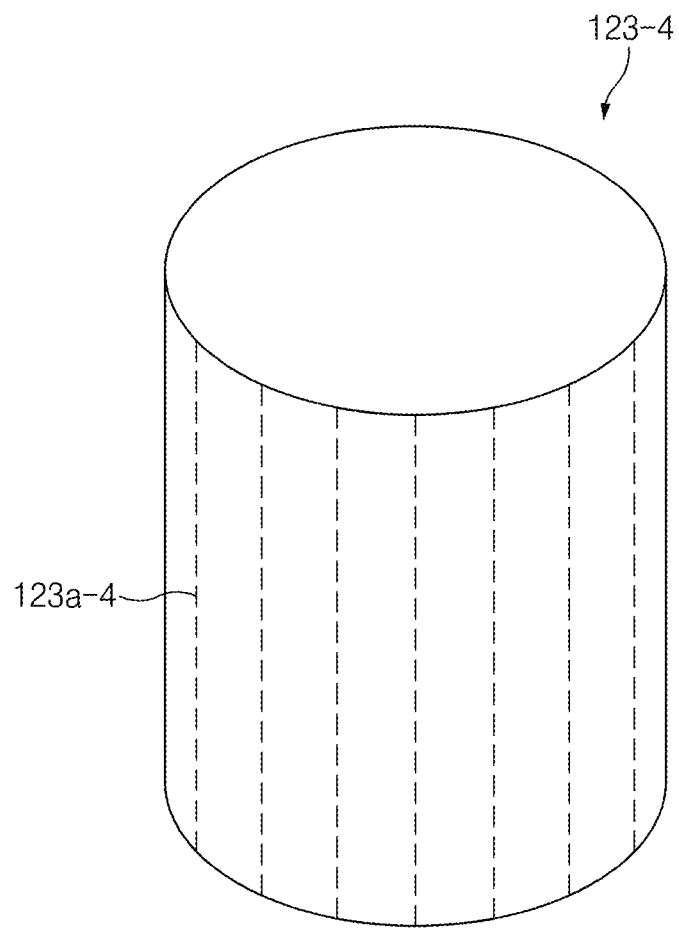
FIG. 8 is a perspective view illustrating a fourth example of the insulator in the secondary battery according to an embodiment of the present invention.

FIG. 6 is a perspective view illustrating a second example of the insulator in the secondary battery according to an embodiment of the present invention, FIG. 7 is a perspective view illustrating a third example of the insulator in the secondary battery according to an embodiment of the present invention, and FIG. 8 is a perspective view illustrating a fourth example of the insulator in the secondary battery according to an embodiment of the present invention.

Referring to FIG. 5, as a first example, the short-circuit induction through-part 123*a*-1 may be provided in plurality to form at least one column in the insulator 123-1. Particularly, the short-circuit induction through-part 123*a*-1 may be provided as through-holes to form the column along a longitudinal direction of the insulator 123-1.

Referring to FIG. 6, as a second example, a plurality of the short-circuit induction through-parts 123*a*-2 may be provided to form at least one row in the insulator 123-2. Particularly, the short-circuit induction through-part 123*a*-2 may be provided as through-holes to form the row along a longitudinal direction of the insulator 123-2.

Referring to FIG. 7, as a third example, a plurality of the short-circuit induction through-parts 123*a*-3 may be provided to form a lattice shape in the insulator 123-3. Particularly, the short-circuit induction through-part 123*a*-3 may be provided as through-holes.

Referring to FIG. 8, as a fourth example, a plurality of the short-circuit induction through-parts 123*a*-4 may be provided to form a cutoff line in the insulator 123-4.

When the battery is in a normal state, the short-circuit induction through-part may have a size that is sufficient so that the first can and the second can do not contact each other. When the battery is in an abnormal state, the short-circuit induction through-part may be deformed in shape so that the first can and the second can contact each other.

Figure 9:
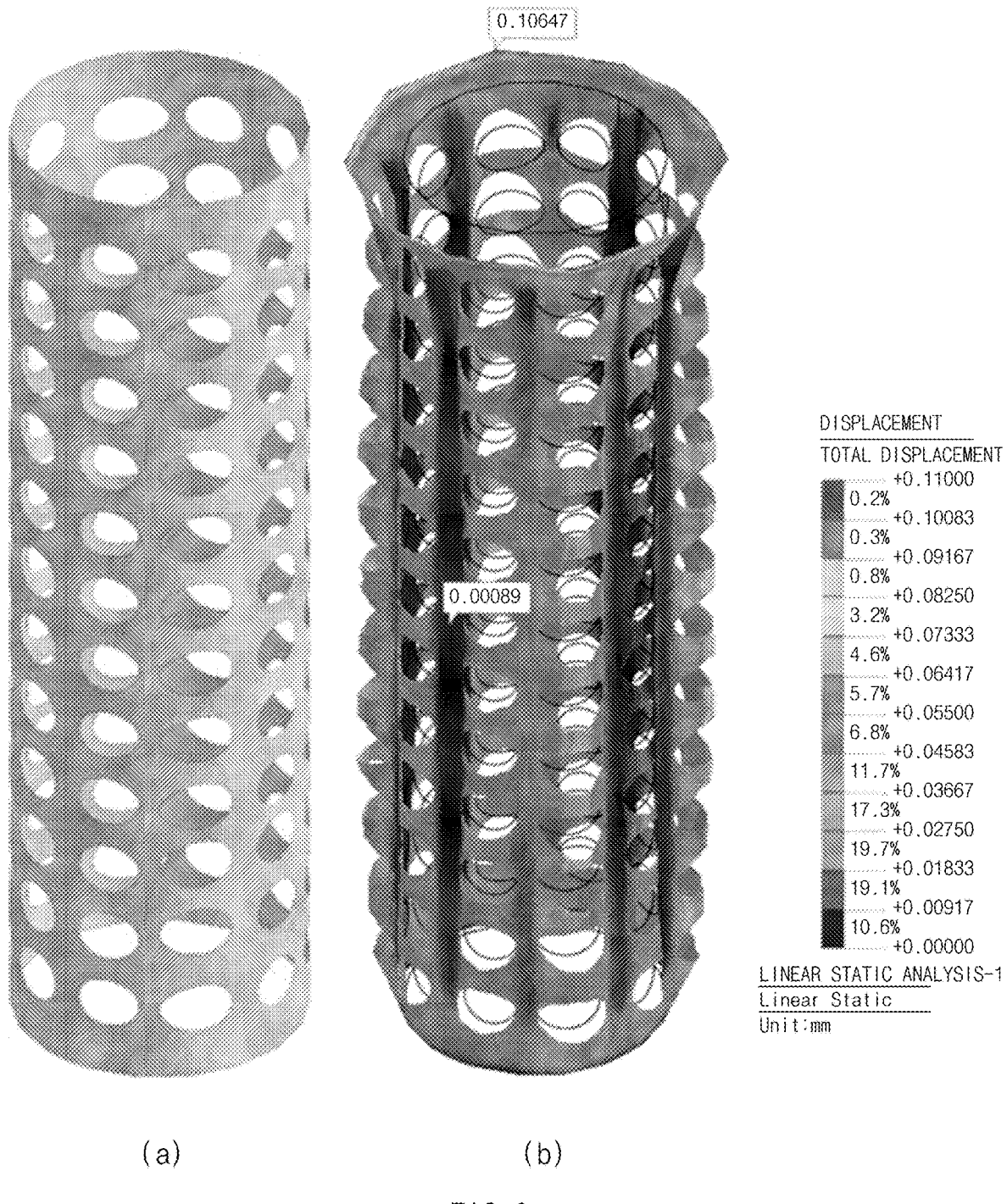
FIG. 9 is a perspective view illustrating states before and after the insulator is deformed in the secondary battery according to an embodiment of the present invention.

FIG. 9 is a perspective view illustrating states before and after the insulator is deformed in the secondary battery according to an embodiment of the present invention. Here, FIG. 9(a) illustrates a state before the insulator is deformed, and FIG. 9(b) illustrates a state after the insulator is deformed.

Referring to FIG. 9, it is seen that the short-circuit induction through-part may be provided as a plurality of through-holes so that a deformation amount of 0.10647 mm occurs when an internal pressure is generated in the insulator having a lattice shape.

As a result, it is seen that as the insulator is subjected to high-temperature heat or a high pressure so as to be contracted or expanded to be deformed in shape, causing short circuit between the first can and the second can.

Hereinafter, a secondary battery according to another embodiment will be described.

Figure 10:
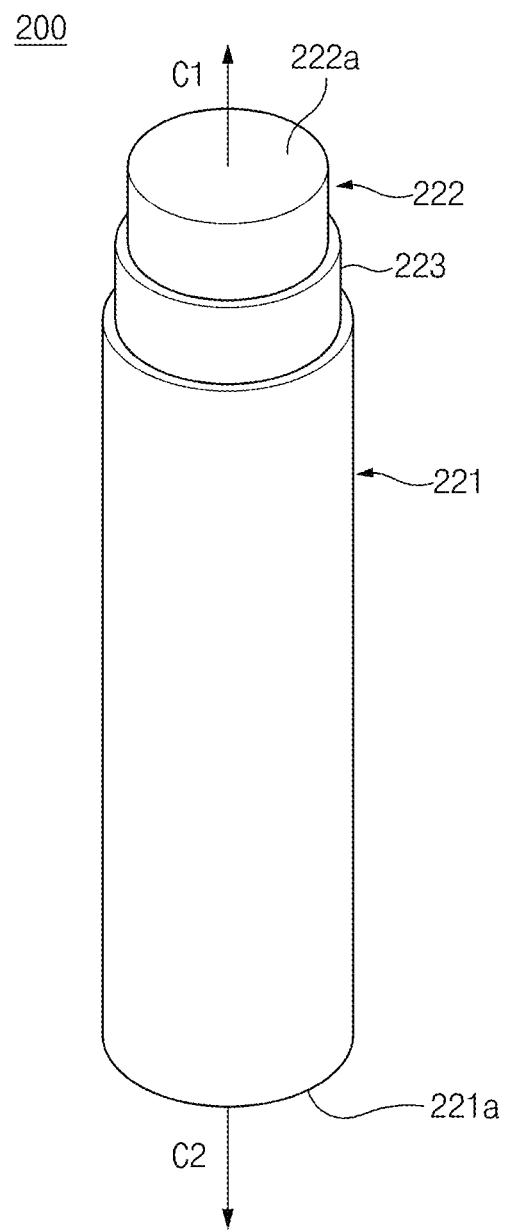
FIG. 10 is a perspective view of a secondary battery according to another embodiment of the present invention.
Figure 11:
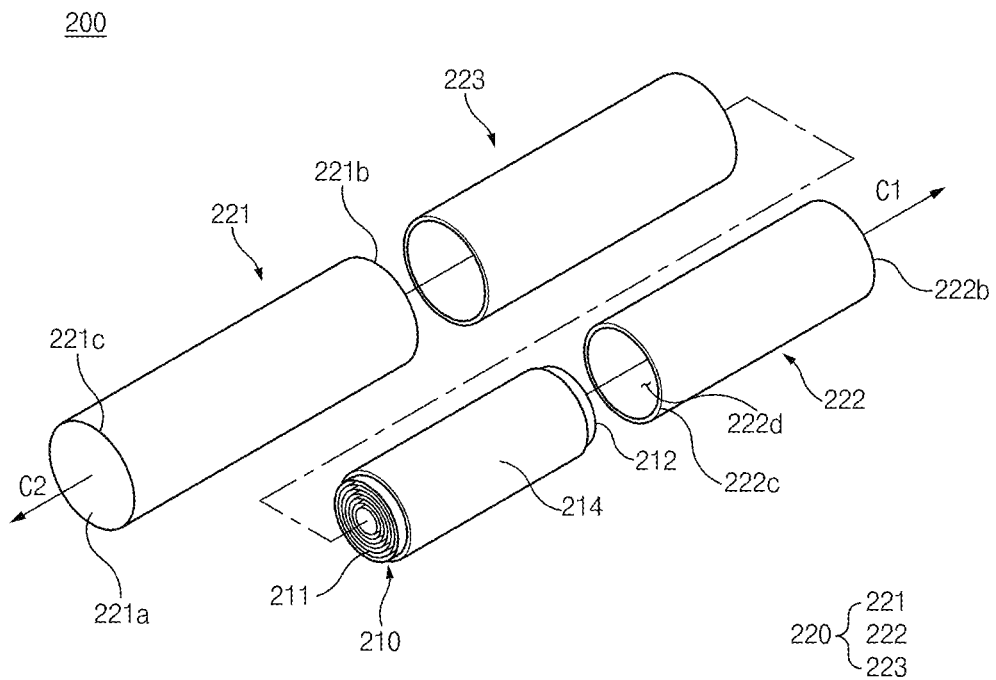
FIG. 11 is an exploded perspective view of the secondary battery according to the embodiment of FIG. 10.

FIG. 10 is a perspective view of a secondary battery according to another embodiment of the present invention, and FIG. 11 is an exploded perspective view of the secondary battery according to the embodiment of FIG. 10.

Referring to FIGS. 10 and 11, a secondary battery 200 according to another embodiment of the present invention comprises an electrode assembly 210 in which a first electrode 211, a separator 214, and a second electrode 212 are alternately stacked, a can 220 comprising a first can 221 and a second can 222, which accommodate the electrode assembly 210 therein, and an insulator 223 insulating an overlapping portion between the first can 221 and the second can 222.

The secondary battery 200 according to the embodiment of FIGS. 10 and 11 is different from the secondary battery according to the foregoing embodiment in the materials of the first can 221 and the second can 222 and the polarities of the first electrode 211 and the second electrode 212. Thus, contents of this embodiment, which are duplicated with those according to the forgoing embodiment, will be briefly described, and also, differences therebetween will be mainly described.

In more detail, in the secondary battery 200 according to this embodiment of the present invention, the can 220 may be provided with an accommodation part that accommodates the electrode assembly 210 therein and comprises a first can 221 and a second can 222, which have cylindrical shapes and are opened in a direction facing each other.

Here, the first can 221 may be electrically connected to the first electrode 211, and the second can 222 may be electrically connected to the second electrode 212.

Also, each of the first can 221 and the second can 222 may have a cylindrical shape. The first can 221 may have an inner circumferential surface greater than an outer circumferential surface of the second can 222 so that the second can 222 is inserted into the first can 221.

Furthermore, the first can 221 may have one side 221b in which a first opening (not shown) that is opened in one direction C1 is formed and the other side 221c at which a first connection part 221a that is closed in the other direction C2 is formed. The second can 222 may have the other side 222c in which a second opening 222d that is opened in the other direction C2 is formed and one side 222b at which a second connection part 222a that is closed in the one direction C1 is formed. At this time, the first electrode 211 may have one end connected to the first connection part 221a, and the second electrode 212 may have one end connected to the second connection part 222a.

The insulator 223 may comprise an insulation material to insulate the overlapping portion between the first can 221 and the second can 222.

Also, a short-circuit induction through-part 123a-1 that is provided in the form of a through-hole or a cutoff line may be formed in the insulator 223. Here, short circuit may occur between the first can 221 and the second can 222 through the short-circuit induction through-part 123a-1 that is deformed in shape when the insulator 223 is contracted or expanded by heat or a pressure (see FIG. 5).

Also, the first can 221 may comprise aluminum, and the second can 222 may comprise steel. Here, the second can 222 disposed at the inside may comprise the steel, and thus, the first can 221 and the second can 222 may be easily press-fitted with respect to each other due to physical properties of high rigidity (it is preferable that the first can and the second can according to the present invention are coupled to each other in the press-fitting manner). When external force occurs, it may be easy to protect an object to be accommodated such as the electrode assembly 210 accommodated into the can 220. Also, in the can 220, the first can 221 disposed at the outside may comprise aluminum having a high strain rate. Thus, when the first can 221 is deformed, the insulator may be deformed to easily cause short circuit between the first can 221 and the second can 222 through the short-circuit induction through-part 123a-1.

Here, the first electrode 211 may be provided as a positive electrode, and the second electrode 212 may be provided as a negative electrode.

Hereinafter, a secondary battery according to further another embodiment will be described.

Figure 12:
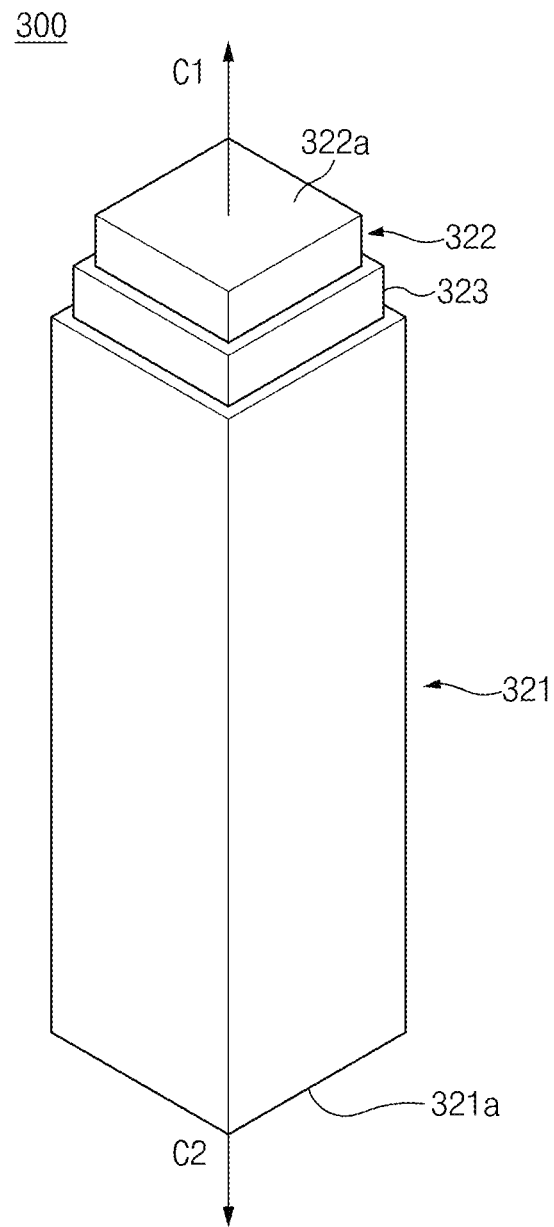
FIG. 12 is a perspective view of a secondary battery according to a further embodiment of the present invention.
Figure 13:
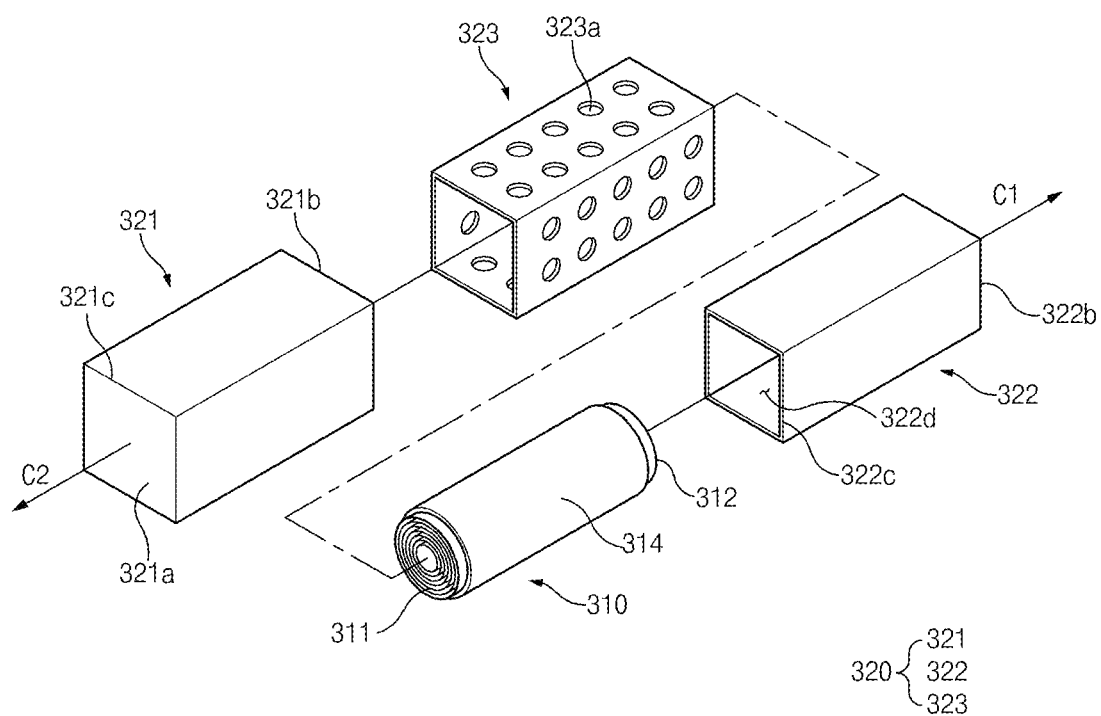
FIG. 13 is an exploded perspective view of the secondary battery according to the embodiment of FIG. 12.

FIG. 12 is a perspective view of a secondary battery according to a further embodiment of the present invention, and FIG. 13 is an exploded perspective view of the secondary battery according to the embodiment of FIG. 12.

Referring to FIGS. 12 and 13, a secondary battery 300 according to the further embodiment of the present invention comprises an electrode assembly 310 in which a first electrode 311, a separator 314, and a second electrode 312 are alternately stacked, a can 320 comprising a first can 321 and a second can 322, which accommodate the electrode assembly 310 therein, and an insulator 323 insulating an overlapping portion between the first can 321 and the second can 322.

The secondary battery 300 according to this embodiment of the present invention is different from the secondary batteries according to the foregoing embodiments in a shape of the can 310. Thus, contents of this embodiment, which are duplicated with those according to the forgoing embodiment, will be omitted or briefly described, and also, differences therebetween will be mainly described.

In more detail, in the secondary battery 300 according to this embodiment of the present invention, the can 320 may be provided with an accommodation part that accommodates the electrode assembly 310 therein, and the can 320 may comprise a first can 321 and a second can 322, which have cylindrical shapes and are opened in a direction facing each other.

Here, the first can 321 may be electrically connected to the first electrode 311, and the second can 322 may be electrically connected to the second electrode 312.

Also, each of the first can 321 and the second can 322 may have a rectangular cylindrical shape. The first can 321 may have an inner width greater than an outer width of the second can 322 so that the second can is inserted into the first can 321.

Furthermore, the first can 321 may have one side 321*b* in which a first opening (not shown) that is opened in one direction C1 is formed and the other side 321*c* at which a first connection part 321*a* that is closed in the other direction C2 is formed. The second can 322 may have the other side 322*c* in which a second opening 322*d* that is opened in the other direction C2 is formed and one side 322*b* at which a second connection part 322*a* that is closed in the one direction C1 is formed. At this time, the first electrode 311 may have one end connected to the first connection part 321*a*, and the second electrode 312 may have one end connected to the second connection part 322*a*.

The insulator 323 may comprise an insulation material to insulate the overlapping portion between the first can 321 and the second can 322.

Also, a short-circuit induction through-part 323*a* that is provided in the form of a through-hole or a cutoff line may be formed in the insulator 323. Here, the short circuit occurs between the first can 321 and the second can 322 through the short-circuit induction through-part 323*a* that is deformed in shape when the insulator 323 is contracted or expanded by heat or a pressure.

In the secondary battery 300 according to this embodiment of the present invention, for example, the first can 321 may comprise steel, and the second can 322 may comprise aluminum.

Furthermore, for another example, the first can 321 may comprise aluminum, and the second can 322 may comprise steel.

In the secondary battery 300 according to this embodiment of the present invention, for example, the first electrode 311 may be provided as a negative electrode, and the second electrode 312 may be provided as a positive electrode.

Furthermore, for another example, the first electrode 311 may be provided as a positive electrode, and the second electrode 312 may be provided as a negative electrode.

Manufacturing Example 1

Figure 14:
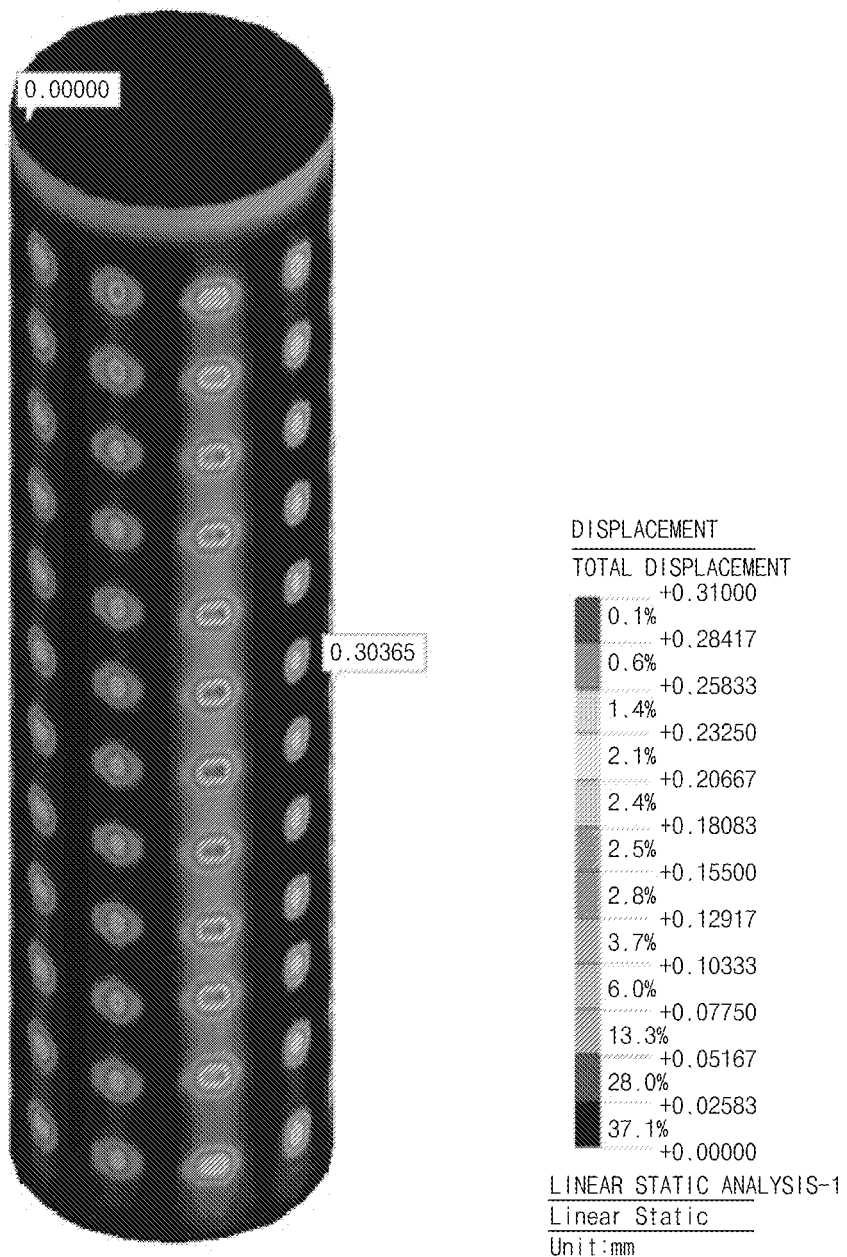
FIG. 14 is a view illustrating a displacement of a can in a secondary battery according to Manufacturing Example 1.

FIG. 14 is a view illustrating a displacement of a can in a secondary battery according to Manufacturing Example 1.

A secondary battery was manufactured comprising an electrode assembly, a can, and an insulator. The can, which comprised a first can and a second can having cylindrical shapes that were open in directions facing each other, had an accommodation part for accommodating the electrode assembly therein. The insulator, for insulating an overlapping portion between the first can and the second can, had a short-circuit induction through-part including a through-hole.

Here, the outer can that is the first can disposed at the outside was made of steel, and the inner can that is the second can disposed at the inside was made of aluminum. Here, the outer can had a thickness of 0.1 t (t=1 mm), and the inner can had a thickness of 0.1 t.

Also, the insulator was made of a polymer PP material and a thickness 0.1 t (t=1 mm).

The inner can had an outer diameter of 50 mm.

Manufacturing Example 2

Figure 15:
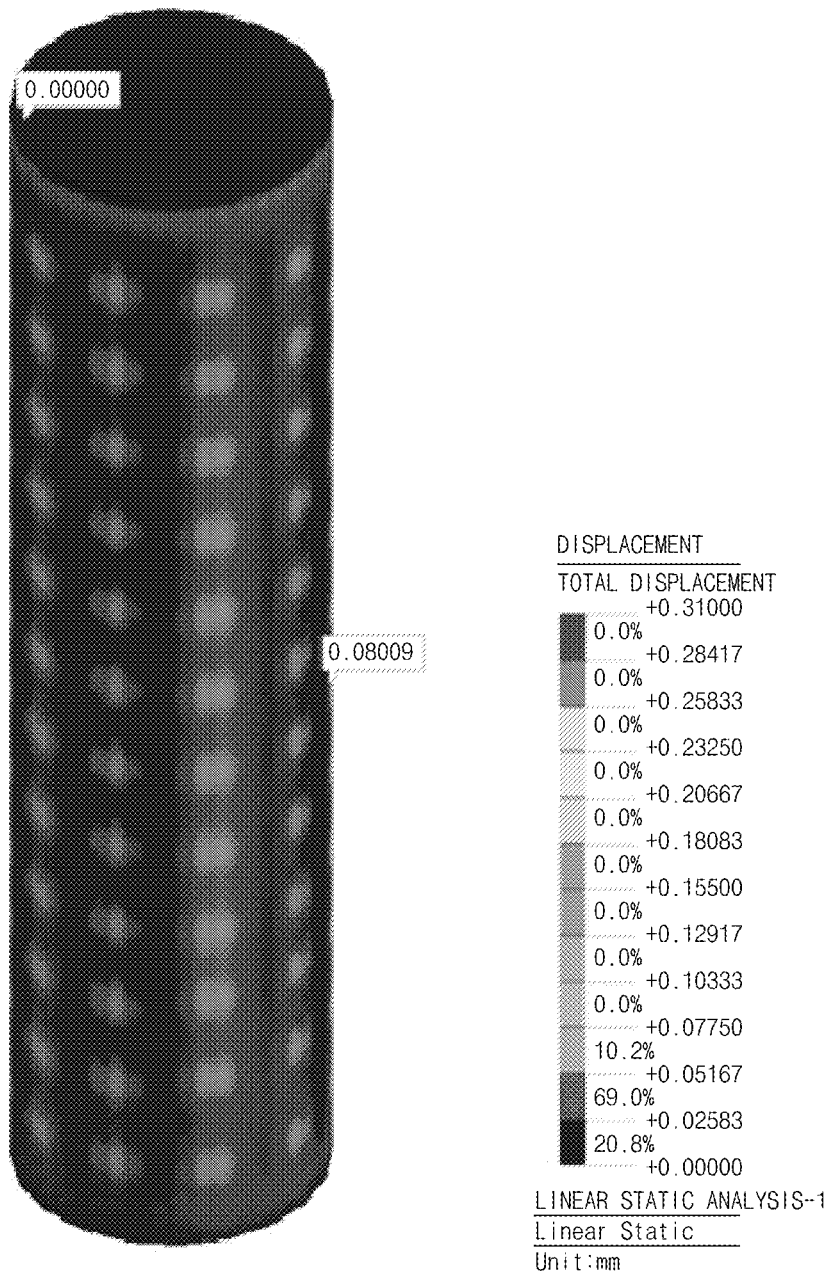
FIG. 15 is a view illustrating a displacement of a can in a secondary battery according to Manufacturing Example 2.

FIG. 15 is a view illustrating a displacement of a can in a secondary battery according to Manufacturing Example 2.

A secondary battery was manufactured comprising an electrode assembly, a can, and an insulator. The can, which was comprised of a first can and a second can having cylindrical shapes that were open in directions facing each other, had an accommodation part for accommodating the electrode assembly therein. The insulator, for insulating an overlapping portion between the first can and the second can, had a short-circuit induction through-part including a through-hole.

Here, the outer can that is the first can disposed at the outside was made of aluminum, and the inner can that is the second can disposed at the inside was made of steel. Here, the outer can has a thickness of 0.1 t (t=1 mm), and the inner can has a thickness of 0.1 t.

Also, the insulator was made of a PP material and a thickness 0.1 t (t=1 mm).

The inner can had an outer diameter of 50 mm.

Comparative Example 1

Figure 16:
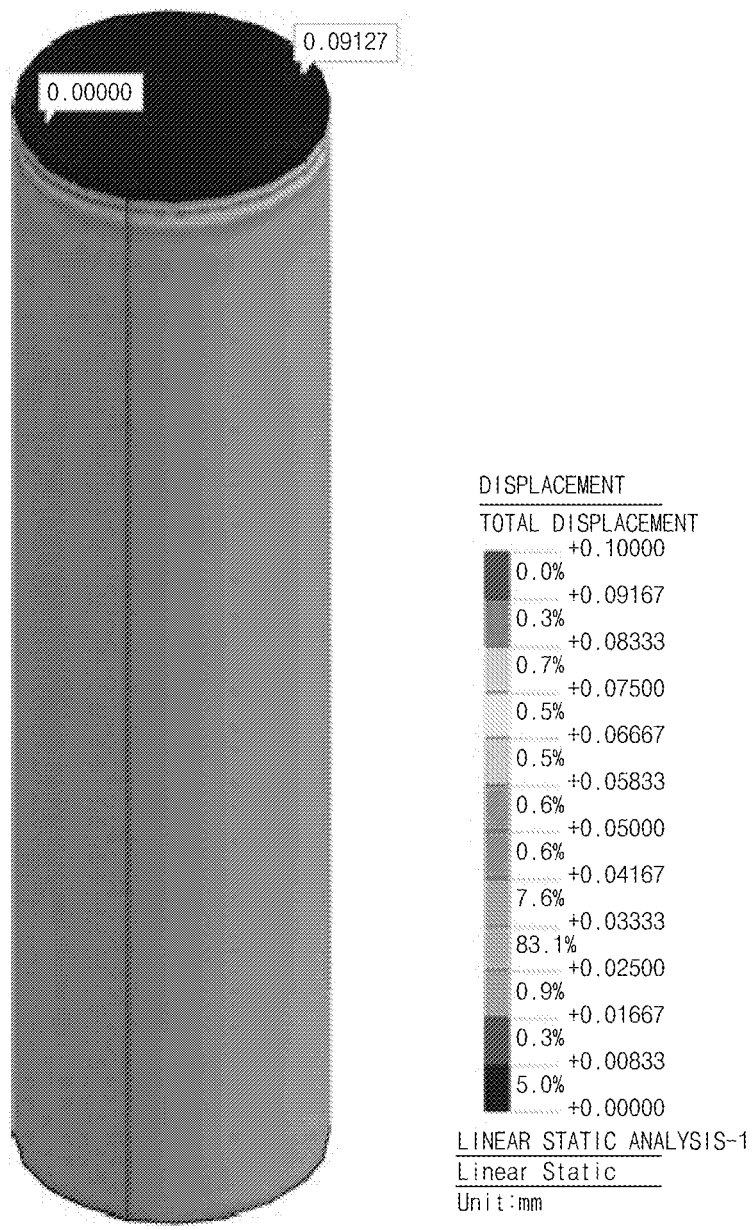
FIG. 16 is a view illustrating a displacement of a can in a secondary battery according to Comparative Example 1.

FIG. 16 is a view illustrating a displacement of a can in a secondary battery according to Comparative Example 1.

A secondary battery was manufactured comprising an electrode assembly, a can, and an insulator. The can, which was comprised of a first can and a second can having cylindrical shapes that were open in directions facing each other, had an accommodation part for accommodating the electrode assembly therein. The insulator, for insulating an overlapping portion between the first can and the second can, did not have a short-circuit induction through-part including a through-hole.

Here, the outer can that is the first can disposed at the outside was made of steel, and the inner can that is the second can disposed at the inside was made of aluminum. Here, the outer can has a thickness of 0.1 t (t=1 mm), and the inner can has a thickness of 0.1 t.

Also, the insulator was made of a polymer PP material and a thickness 0.1 t (t=1 mm).

The inner can had an outer diameter of 50 mm.

Comparative Example 2

Figure 17:
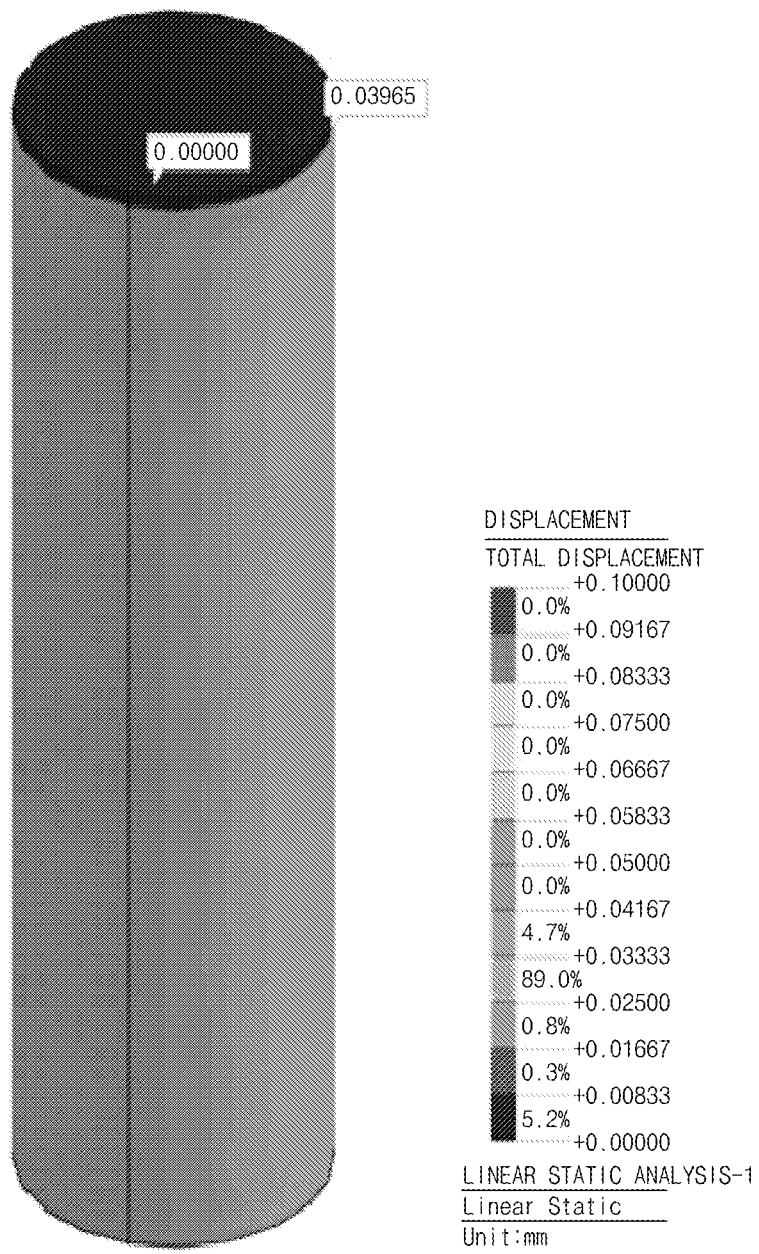
FIG. 17 is a view illustrating a displacement of a can in a secondary battery according to Comparative Example 2.

FIG. 17 is a view illustrating a displacement of a can in a secondary battery according to Comparative Example 2.

A secondary battery was manufactured comprising an electrode assembly, a can, and an insulator. The can, which was comprised of a first can and a second can having cylindrical shapes that were open in directions facing each other, had an accommodation part for accommodating the electrode assembly therein. The insulator, for insulating an overlapping portion between the first can and the second can, did not have a short-circuit induction through-part including a through-hole.

Here, the outer can that is the first can disposed at the outside was made of aluminum, and the inner can that is the second can disposed at the inside was made of steel. Here, the outer can has a thickness of 0.1 t (t=1 mm), and the inner can has a thickness of 0.1 t.

Also, the insulator was made of a polymer PP material and a thickness 0.1 t (t=1 mm).

The inner can had an outer diameter of 50 mm.

Experimental Example

A displacement of an inner can due to a pressure acting to be expanded from the inside to the outside of the battery was displayed when an internal pressure acting on a can was 1.5 MPa, both inner and outer cans acted in an outward direction, and top and bottom surfaces of the can were subjected to the same restriction conditions.

As a result of the experiment, referring to FIG. 14, it is seen that when the can made of aluminum (Al) according to Manufacturing Example 1 is located at the inside, a deformation amount of 0.30365 mm occurs. Referring to FIG. 15, it is seen that when the can made of steel according to Manufacturing Example 2 is located at the inside, a deformation amount of 0.08009 mm occurs. That is, it is seen that when the can made of aluminum (Al) is located at the inside, the can expands more due to its lower elastic modulus lower than when the can made of steel is located at the inside. Also, it may be expected that even plastic deformation occurs to implement sufficient deformation. The large expansion under the same conditions may mean that the short-circuit induction through-part is more largely deformed under the same conditions. If the deformation of the short-circuit induction through-part is lager, the short circuit between the first can and the second can may occur more easily. However, when the can made of the steel material is located at the inside, a process (a press-fitting process) of fitting the inner can into the outer can may be easy due to physical properties of high rigidity of the steel.

Also, referring to FIG. 16, it is seen that when the can made of aluminum (Al) according to Comparative Example 1 is located at the inside, a deformation amount of 0.09127 mm occurs. Referring to FIG. 17, it is seen that when the can made of steel according to Comparative Example 2 is located at the inside, a deformation amount of 0.03965 mm occurs.

Therefore, as illustrated in FIGS. 14 to 17, when comparing to Comparative Examples 1 and 2 in which the insulator having no short-circuit induction through-part in the form of the through-hole is provided between the outer can and the inner can, it is seen that more expansion occurs than in the can according to Manufacturing Examples 1 and 2 in which the insulator comprising the short-circuit induction through-part formed in the form of the through-hole is provided between the outer can and the inner can.

As a result, the large expansion under the same conditions may mean that the insulator is more largely deformed under the same conditions. As a result, it is seen that the deformation of the short-circuit induction through-part largely occurs, and thus, the short circuit between the first can and the second can easily occurs.

While the present invention has been particularly shown and described with reference to exemplary embodiments thereof, it is to be understood that the scope of the present invention is not limited to the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising:
    an electrode assembly in which a first electrode, a separator, and a second electrode are alternately stacked and wound together;
    a can having an accommodation part configured to receive the electrode assembly therein, the can comprising a first can and a second can each having a tubular shape with an opening in a direction facing one another, the first can overlapping the second can at an overlapping portion; and
    an insulator having a thickness configured to insulate the overlapping portion between the first can and the second can,
    wherein the first can is electrically connected to the first electrode, and the second can is electrically connected to the second electrode,
    the insulator includes a short-circuit induction through-part defined by a through-hole or a frangible seam extending through the thickness of the insulator, the short-circuit induction through-part being configured such that when sufficient heat or pressure is applied to contract or expand the insulator, a shape of the short-circuit induction through-part will deform to cause a short circuit between the first can and the second can.

2. The secondary battery of claim 1, wherein the insulator includes a plurality of the short-circuit induction through-parts.

3. The secondary battery of claim 2, wherein the short-circuit induction through-parts are arranged in at least one row or column in the insulator.

4. The secondary battery of claim 2, wherein the short-circuit induction through-part are arranged in a lattice shape in the insulator.

5. The secondary battery of claim 1, wherein the insulator comprises a polymer material.

6. The secondary battery of claim 5, wherein the polymer material comprises one of polyethylene (PE), polypropylene (PP), and polyethylene terephthalate (PET).

7. The secondary battery of claim 5, wherein the polymer material comprises a PE or PP material having a melting point of 180° C. or less.

8. The secondary battery of claim 1, wherein the first can has an inner circumferential surface larger than an outer circumferential surface of the second can so that the second can is received within the first can.

9. The secondary battery of claim 8, wherein the insulator is formed as a coating layer on the outer circumferential surface of the second can.

10. The secondary battery of claim 8, wherein the insulator is attached to the outer circumferential surface of the second can by any one of painting, printing, cladding, lamination, spraying, masking, dipping, and bonding.

11. The secondary battery of claim 8, wherein the first can has a first side having a first opening that is open in a first direction, and the first can has a second side having a first connection part that is closed in a second direction opposite the first direction,
    the second can has a second side having a second opening that is open in the second direction, and the second can has a first side having a second connection part that is closed in the first direction, and
    the first electrode has a first end connected to the first connection part, and the second electrode has a second end connected to the second connection part.

12. The secondary battery of claim 11, wherein a first end of the insulator extends so as to be closer to the second connection part than an end of the first can at the first side of the first can.

13. The secondary battery of claim 11, wherein a second end of the insulator extends so as to be closer to the first connection part than an end of the second can at the second side of the second can, the second end of the insulator being opposite to the first end of the insulator.

14. The secondary battery of claim 8, wherein the first can comprises steel, and the second can comprises aluminum.

15. The secondary battery of claim 8, wherein the first can comprises aluminum, and the second can comprises steel.

16. The secondary battery of claim 14, wherein the first electrode is a negative electrode, and the second electrode is a positive electrode.

17. The secondary battery of claim 15, wherein the first electrode is a positive electrode, and the second electrode is a negative electrode.

18. The secondary battery of claim 1, wherein the tubular shape of each of the first can and the second can defines a rectangular prism, and the first can has an inner width larger than an outer width of the second can.

\* \* \* \* \*